United States Patent [19]

Hays et al.

[11] Patent Number: 5,572,700
[45] Date of Patent: Nov. 5, 1996

[54] CACHE ACCESS CONTROLLER AND METHOD FOR PERMITTING CACHING OF INFORMATION IN SELECTED CACHE LINES

[75] Inventors: Kirk I. Hays, Hillsboro; Wayne D. Smith, Portland, both of Oreg.

[73] Assignee: Intel Corporation, Santa Clara, Calif.

[21] Appl. No.: 55,962

[22] Filed: Apr. 30, 1993

[51] Int. Cl.$^6$ .................................................. G06F 12/00
[52] U.S. Cl. .......................... 395/466; 395/403; 395/471
[58] Field of Search ................................... 395/425, 400, 395/445, 456, 460, 462, 465, 466, 403, 419, 421.1, 468, 471, 472, 473

[56] References Cited

U.S. PATENT DOCUMENTS

| | | | |
|---|---|---|---|
| 4,885,680 | 12/1989 | Anthony et al. | 395/471 |
| 5,091,850 | 2/1992 | Culley | 395/403 |
| 5,210,847 | 5/1993 | Thome et al. | 395/465 |
| 5,210,850 | 5/1993 | Kelly et al. | 395/727 |
| 5,297,270 | 3/1994 | Olson | 395/403 |
| 5,327,545 | 7/1994 | Begun et al. | 395/460 |
| 5,355,467 | 10/1994 | MacWilliams et al. | 395/473 |
| 5,367,653 | 11/1994 | Coyle et al. | 395/455 |

*Primary Examiner*—Glenn Gossage
*Attorney, Agent, or Firm*—Blakely, Sokoloff, Taylor & Zafman

[57] ABSTRACT

A cache access controller and method for controlling access to a cache memory are implemented in a computer system having a processor for performing memory access operations specifying an address in main memory, and a cache memory comprised of a number of cache lines. The cache access controller includes a control circuit which produces a number of access values in response to the address, each access value being associated with a cache line and having a true or a false state. The controller also includes an access logic circuit which permits the caching of information associated with the address at a cache line if the access value associated with that cache line is true. An operator register and a parameter register associated with a cache line may be used in conjunction with the address to determine the access value for that cache line using arithmetic, logical, or a combination of arithmetic and logical, functions.

29 Claims, 4 Drawing Sheets

CACHE ACCESS CONTROLLER AND METHOD FOR PERMITTING CACHING OF INFORMATION IN SELECTED CACHE LINES

BACKGROUND OF THE INVENTION

1. Field of the Invention

The present invention relates to data processing systems utilizing cache memories, and more particularly to programming access to cache memory.

2. Art Background

Caches are used in various forms to reduce the effective time required by a processor to access instructions or data that are normally stored in main memory. The theory of a cache is that a system attains a higher speed by using a small portion of very fast memory as a cache along with a larger amount of slower main memory. The cache memory is usually placed operationally between the data processing unit or units and the main memory. When the processor needs to access information, it looks first to the cache memory to see if the information required is available in the cache. When data and/or instructions are first called from main memory, the information is stored in cache as part of a block of information taken from consecutive locations of main memory. During subsequent memory accesses to the same addresses, the processor interacts with the fast cache memory rather than main memory. Statistically, when information is accessed from a particular block in main memory, subsequent accesses will call for information from within the same block. This locality of reference property results in a substantial decrease in average memory access time.

Caches work well under the assumption that consecutively executed instructions will continue to call for information from the same area of main memory. However, cache accesses are probabilistic in nature in that many codes do not follow this pattern, but rather attempt to access one portion of main memory, then another, and then eventually return to the first portion of memory. This property is especially evident in numerical analysis and array processing codes. This skipping around causes large portions of code and data to be pushed out of the cache, only to be called for later in the processing cycle. Consequently, for these types of codes memory access time is slowed drastically as the same information is cached, flushed out of the cache and then recached repeatedly.

Many codes have predictable patterns of memory access. However, conventional caching methods do not take advantage of this fact to make the caching of memory locations more deterministic and less probabilistic in nature. Although some methods, like that used in the i860™ processor from Intel Corporation, Santa Clara, Calif., permit the user to disallow certain areas of memory from being cached, this method certainly does not decrease memory access time. Accordingly, it would be desirable to have a caching method that takes advantage of predictable patterns of memory access of certain software codes in order to increase the efficiency of memory accesses.

SUMMARY OF THE INVENTION

The present invention is directed to a cache access controller implemented in a computer system including a processor and a cache memory and a method for controlling access to the cache memory. The processor performs memory access operations which specify an address in main memory. The cache memory is comprised of cache lines for storing data. The cache access controller includes logic for producing a plurality of access values in response to the address specified by the processor, each access value being associated with one of the cache lines and having a true or false state. The cache access controller also includes access circuitry for permitting the caching of information associated with the address at one of the cache lines if the access value corresponding to that cache line is true. In one embodiment of the invention, the controller further includes a number of operator registers, each operator register storing an operator and being associated with a corresponding cache line, and a number of parameter registers, each parameter register storing a parameter and being associated with a corresponding cache line. In this embodiment, the cache access controller logic applies the operator associated with a particular cache line to the address and parameters associated with the same cache line to produce the access value for that cache line.

BRIEF DESCRIPTION OF THE DRAWINGS

The objects, features and advantages of the present invention will be apparent from the following detailed description in which.

DETAILED DESCRIPTION OF THE INVENTION

The present invention provides a method and apparatus for user programmable cache line control. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

Figure 1:
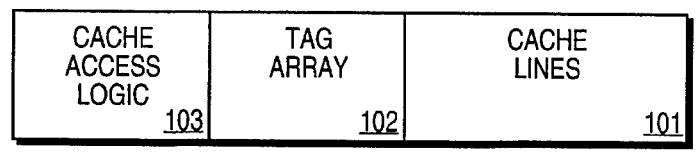
FIG. 1 is a block diagram of a conventional cache.

The present invention permits the user to control which areas of memory occupy a particular cache line, and which memory locations are or are not cacheable. FIG. 1 is a block diagram of a conventional cache. Each cache line in an array of cache lines 101 is capable of storing a block of data from consecutive addresses of main memory. Each cache line is associated with a tag from a tag array 102, which represents the block address of the line. When a processor attempts to access memory, cache access logic 103 in the cache compares the relevant part (the tag field) of the memory address containing the block address to addresses currently stored in the tag array. If there is a match, i.e., a cache hit, then the processor operates on the data or fetches the relevant instruction found in the cache line at the address location. If, however, the address fails to match any of the stored tagged addresses, i.e., a cache miss occurs, then the cache usually initiates a sequence of one or more main memory cycles to copy into the cache the main memory block containing the information at the address location.

As discussed above, part of the advantage of using a fast cache memory is lost when the nature of memory accesses for a particular code results in blocks of information being cached, flushed from the cache and then recached. This property is especially noticeable in large numerical analysis codes, such as image processing software which manipulates large arrays. Fortunately, these codes often have predictable patterns of access, such as when elements of the array are being operated upon in program loops. The present invention takes advantage of these predictable patterns by dedicating areas of the cache to those portions of main memory which would otherwise be subject to frequent caching, flushing and recaching.

Figure 2:
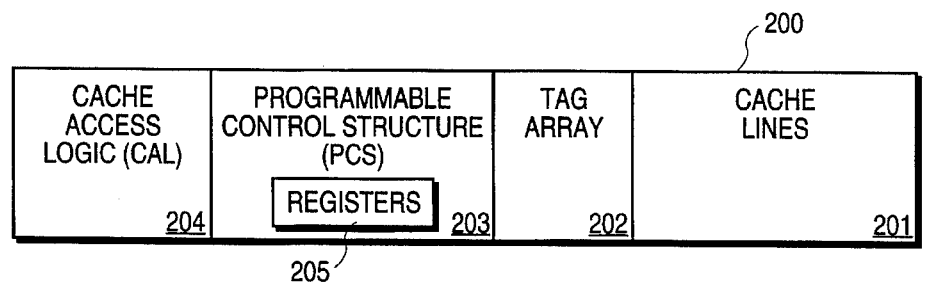
FIG. 2 is a block diagram of a cache of the present invention.

FIG. 2 is a block diagram of the cache of the present invention. The cache access logic of the standard cache of FIG. 1 is augmented with a programmable control structure (PCS) that only permits predetermined main memory locations to be stored in a particular cache line. In this manner, each line is dedicated only to predetermined main memory addresses.

The programmable control structure 203 is incorporated as part of the cache access logic 204. A memory location is allowed to be stored at a particular cache line only if the PCS determines that that memory location is valid cacheable for that particular line. For each cache line, the PCS determines cacheability based upon whether an arithmetic/logic expression programmed by the user is determined to be true for the main memory address that the processor is attempting to cache. In a preferred embodiment, the arithmetic/logic expression may take the general form:

((Address.A.Value).L.Mask).C.0, where:

Address is a main memory address (a binary number defining an address location), A is an arithmetic operator, L is a logical operator, C is a comparison operator, and Value and Mask parameters are binary numbers.

The logical operators include, but are not limited to, the AND, OR, NOT, NOR, XOR and NAND functions. The arithmetic operators include, but are not limited to, the addition, subtraction and shifting functions. Finally, the comparison operators include, but are not limited to, the $<$, $>$, $\geq$, $\leq$, $=$ and $\neq$ comparisons.

This expression is by no means the only way in which to implement the PCS of the present invention. For example, the simple expression min$\leq$Address $\leq$max may be used to specify a range of cacheable addresses from a minimum address value parameter (min) to a maximum address (max) for a particular cache line. In general, the order of the elements of the PCS expression may be rearranged, the number of arithmetic, logical or comparison operators may be increased or decreased, and more Value and Mask variables may be introduced. However, the simple expression of the preferred embodiment provides a great degree of flexibility while requiring only a small number of elements. Examples of useful expressions follow (numbers are expressed in hexadecimal representations):

1. Cache only addresses within the 4 KB block starting at address 41000: ((Address—41000) AND FFFFF000)= 0;

2. Cache only memory addresses at or above FF000000: ((Address—0) AND FF000000)$\neq$0;

3. Cache only memory addresses divisible by 64 K: ((Address <<16) OR 0)=0, where << indicates left shift.

The preferred embodiment of the present invention permits the user to program the PCS by specifying the components of the PCS expression in a set of registers 205 for each cache line. In this embodiment, the registers store the arithmetic, logical and comparison operators, as well as Value and Mask. Programming may be implemented using a number of techniques, including memory mapping, input/output (I/O) mapping, programmable memory or a special instruction set. It would be apparent to one skilled in the art that programming would not be limited to these techniques and that other methods may be used as well.

Using memory mapping, a block of main memory addresses are reserved as the addresses of the PCS registers, which are themselves resident in the PCS 203. Through a simple program run through a processor, the user can program the registers as if the user were simply writing to main memory. In a manner similar to using mapped memory, a block of I/O port addresses may be reserved as the addresses of the registers. The registers are programmed using the instructions for writing to those I/O ports. Programming can also be implemented using programmable memory such as an erasable programmable read only memory (EPROM) to hold the set of PCS registers for each cache line. Finally, a small special instruction set can be used for programming the registers.

Given the small number of operators and operands utilized by the PCS expression, the PCS may be implemented by one skilled in the art using an application specific integrated circuit (ASIC) or a programmable logic array (PLA). Once programmed, the PCS is ready to handle cache operations.

Figure 3A:
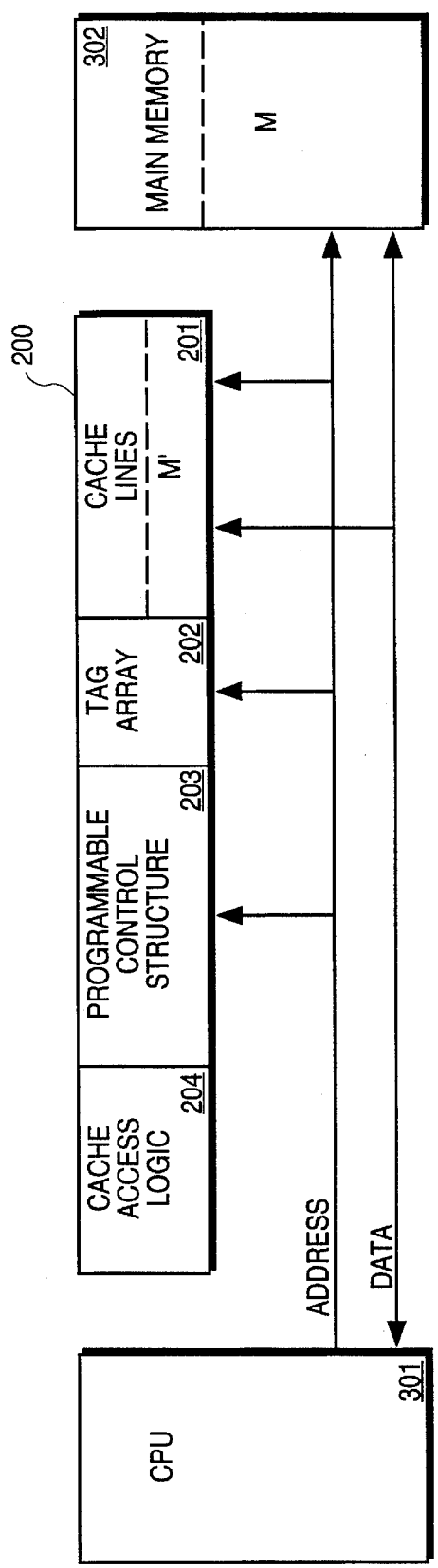
FIGS. 3A and 3B are block diagrams of computer systems incorporating the cache of the present invention.
Figure 3B:
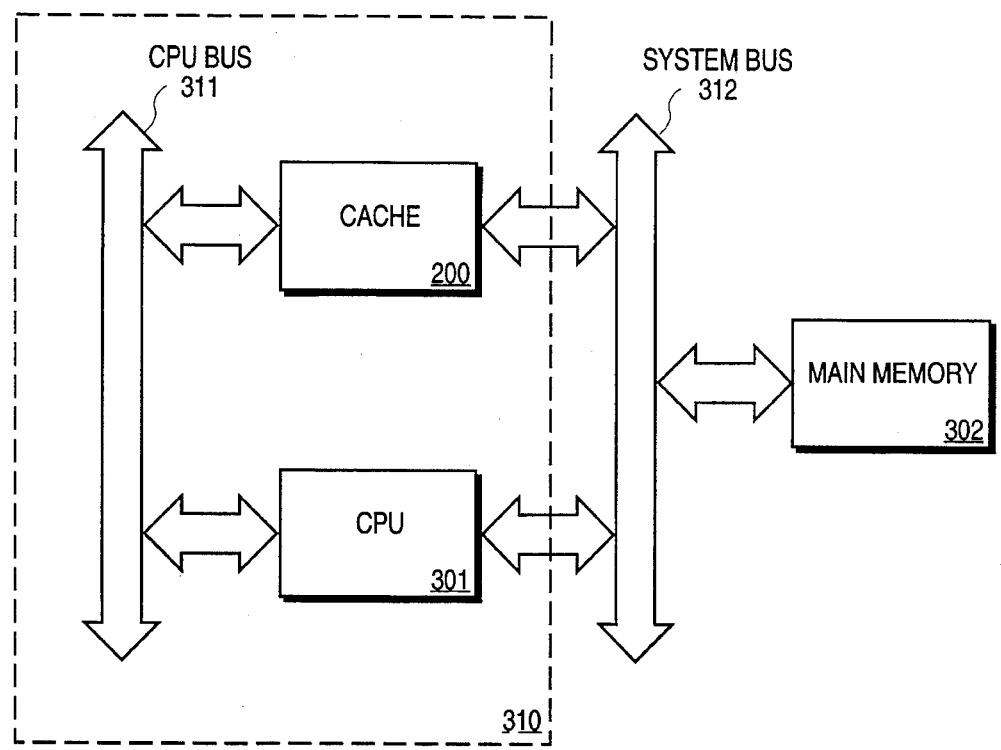
Figure 4:
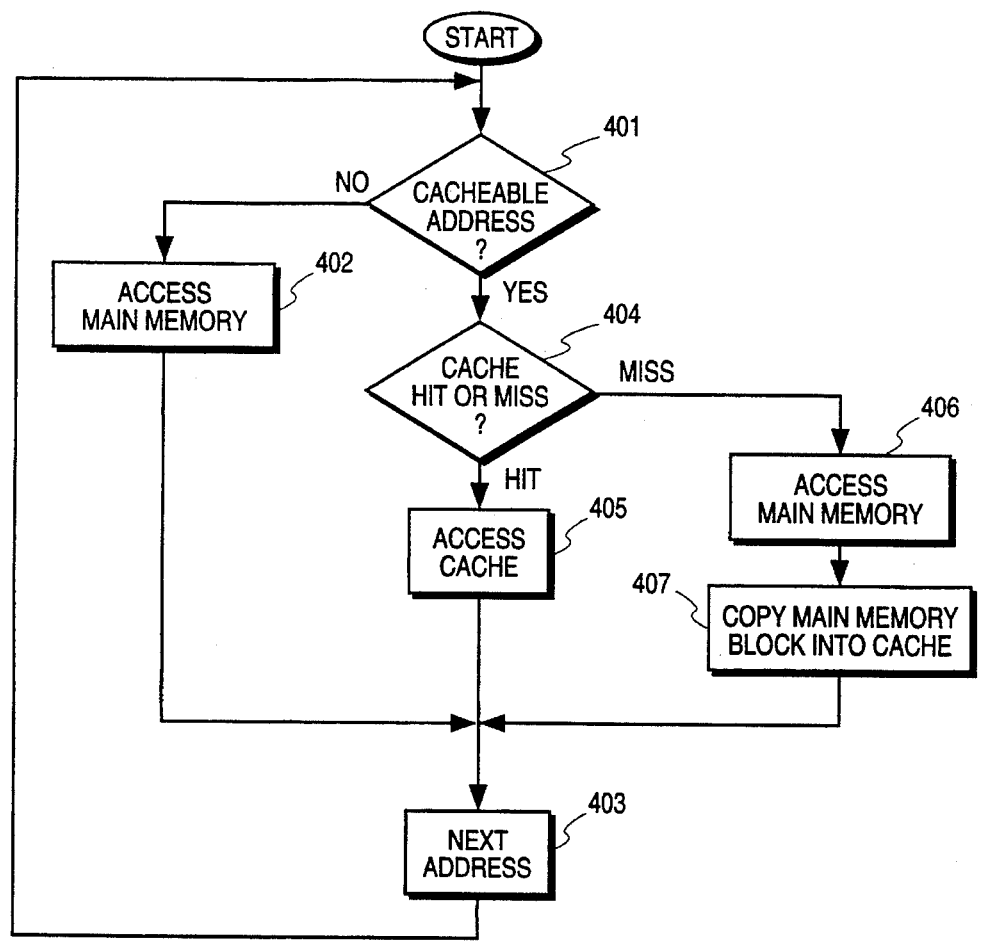
FIG. 4 is a flowchart of a method of controlling access to a cache according to the present invention.

FIGS. 3A and 3B are block diagrams of embodiments of computer systems incorporating the cache of the present invention. FIG. 3A is an embodiment whereby the cache 200 and the central processing unit (CPU) 301 are resident on different integrated circuit chips, while in FIG. 3B the cache 200 and the CPU 301 are on the same chip 310 and communicate with each other over an internal CPU bus 311, and with main memory 302 over a system bus 312. FIG. 4 is a flow-chart illustrating a method of controlling access to a cache according to an embodiment of the present invention. Referring to FIGS. 3A, 3B and 4, the operation of the present invention will be described. During a memory access cycle, the address tag portion of the main memory address is first fed by the CPU 301 to the PCS 203 portion of the cache access logic 204 to determine whether that address is cacheable in any part of the cache array 201 (Step 401). In other words, the PCS determines whether the PCS expression is true for that address. If not, then the cache 200 is bypassed and the CPU 301 executes memory read and write operations directly with main memory 302 (Step 402), before proceeding on to the next memory access cycle (Step 403).

If, however, the PCS 203 detects an address which may be cached at a particular cache line, then the cache operates in an otherwise normal fashion for that line and determines whether the address results in a cache hit or a cache miss through comparison of the tag field of the address with the address tag of the line (Step 404). If a cache hit is detected, then memory access occurs from cache 200 (Step 405). Otherwise, the CPU 301 accesses main memory (Step 406) and the memory block containing information accessed by the specified address is transferred into the cache line (Step 407). This cache line cannot be flushed from its dedicated area specified by the PCS expression except during a cache miss by an address in another cache line that satisfies that expression and under the condition that all cache locations specified by the same PCS expression are full of valid cache lines.

Using the PCS of the present invention, the user has a great deal of flexibility in determining whether and where predetermined main memory addresses are to be cacheable. A number of options are available. For example, the PCS may be set to true for all cache lines, meaning that the cache 200 operates as a conventional probabilistic cache, permitting any main memory address to be cached in any cache line. On the other hand, the user may program the PCS expressions so that certain blocks of main memory can never be stored in the cache, meaning that all processor accesses to those areas of memory must be handled through interactions between the CPU 301 and main memory 302 directly without use of the cache 200.

Referring back to the first exemplary expression, the PCS is programmed so that the cache lines occupying the area M' below the dashed line in the cache array 201 will allow the caching of any address location within the 4 KB block starting at address 41000 in main memory 302. That 4 KB block of cacheable main memory addresses is represented by the area M below the dashed line in main memory 302 of FIG. 3A. The ratio of memory capacity represented by the cache lines in M' to the memory space M can occupy a wide range of values, typically 1-to-1 down to the ratio represented by one cache line for the entire memory space M. If the storage capacity of M' equals the capacity of M, then all of the data or instructions stored in M can be cached in the area M'. After that information is cached, it is essentially "locked down" in that dedicated cache area, meaning that the information cannot be pushed out of the cache. The rest of the cache can operate in the traditional manner or contain further dedicated areas depending upon the programming of the PCS.

As one alternative, the capacity of M' can be selected to be smaller than that of M. In that case, access to M' is still limited to those addresses that make the PCS expression true; that is the 4 KB blocks starting at address 41000 in this example. However, M' cannot store all addresses that are valid for this expression, resulting in some cache traffic between M' and M in those instances when M' is full and a cache miss for addresses in M occurs.

In either case, dedicating areas of the cache to address locations holding frequently used information will result in a substantial decrease in average memory access time, because the number of cache misses will be fewer than that found in a fully probabilistic cache.

The advantages of the user programmable cache line control of the present invention are highlighted in a number of applications. As mentioned above, conventional probabilistic caches experience poor performance when operating with large arrays containing frequently used variables when the program code requires repetitive recaching of those variables. Recaching also occurs when program interrupts require access to infrequently used variables that are stored in the cache and the interrupt code itself is cached, thus pushing out parts of an array that should always be accessible. Using the present invention, the array can be "locked down" in the designated area of the cache.

Experience also shows that the use of probabilistic caches is not feasible for real time processing. One must know the fixed memory access time in order to determine whether a processor can handle real time operations under given time constraints. However, for a probabilistic cache processing time is indeterminate. In contrast, using the present invention, the instructions and data used by a real time process can be locked down into dedicated areas of the cache. This would guarantee a fixed memory access time, which in turn would guarantee the execution speed of the real time process. One particularly useful real time application of the present invention is permanent mapping of interrupt handling code and global data structures into part of the cache to permit guaranteed rapid access to those frequently utilized instructions and data.

Although the invention has been described in conjunction with various embodiments, it will be appreciated that modifications and alterations might be made by those skilled in the art without departing from the spirit and scope of the invention.

We claim:

1. In a computer system having a processor for performing memory access by specifying an address in a main memory, and a cache memory comprising cache lines, a cache access controller comprising:

a control circuit for producing a plurality of access values in response to said address, each access value associated with a corresponding one of said cache lines and having a true or a false state; and an access logic circuit for permitting caching of information associated with said address at one of said cache lines if its corresponding access value is true.

2. The controller of claim 1, wherein said control circuit comprises:

a plurality of operator registers, each operator register storing an operator for a corresponding one of said cache lines;

a plurality of parameter registers, each parameter register storing a parameter for a corresponding one of said cache lines; and said control circuit applying said operators to said parameters and said address to produce said access values.

3. The cache access controller of claim 2, wherein said operators comprise arithmetic, logic and comparison operators.

4. The cache access controller of claim 2, said control circuit applying said operators to said parameters to produce access values corresponding to said cache lines according to the following expression:

((address A value )L mask) C 0, wherein address=said address in binary form, value=a first binary number parameter, mask=a second binary number parameter, A=an arithmetic operator, L=a logical operator, C=a comparison operator, and 0=zero.

5. The cache access controller of claim 2 said control circuit applying said operators to said parameters to produce access values corresponding to said cache lines according to the following expression:

min≦ address≦ max, wherein address=said address, min=a minimum address value parameter, and max=a maximum address value parameter.

6. The cache access controller of claim 2, wherein said operator and parameter registers are programmable by a user.

7. The cache access controller of claim 6, wherein a plurality of main memory addresses are reserved for said operator and parameter registers, said operator and parameter registers being programmed using main memory write operations.

8. The cache access controller of claim 6, wherein a plurality of input/output port addresses are reserved for said operator and parameter registers, said operator and parameter registers being programmed using input/output write operations.

9. The cache access controller of claim 6, wherein said operator and parameter registers are disposed in programmable memory.

10. The cache access controller of claim 6, wherein said operator and parameter registers are programmed using dedicated write operations.

11. The cache access controller of claim 2, a first plurality of said operator registers associated with a dedicated cache area of cache lines storing a predetermined plurality of operators, a second plurality of said operator registers associated with all other cache lines, a first plurality of said parameter registers associated with said dedicated cache area storing a predetermined plurality of parameters, a second plurality of said parameter registers associated with said all other cache lines.

12. The cache access controller of claim 11, wherein a storage capacity of said dedicated cache area is equal to a storage capacity of an area of said main memory storing information cacheable in said dedicated cache area.

13. The cache access controller of claim 11 wherein a storage capacity of said dedicated cache area is less than a storage capacity of an area of said main memory storing information cacheable in said dedicated cache area.

14. The cache access controller of claim 11, wherein said dedicated cache area caches frequently used variables.

15. The cache access controller of claim 11, wherein said dedicated cache area caches interrupt handling instructions.

16. In a computer system having a processor for performing memory access by specifying an address in a main memory, and a cache memory comprising cache lines, a method for controlling access to said cache memory comprising the steps of:

producing a plurality of access values in response to said address, each access value associated with a corresponding one of said cache lines and having a true or a false state; and permitting caching of information associated with said address at one of said cache lines if its corresponding access value is true.

17. The method of claim 16, further comprising the step of caching said information at a particular one of said cache lines if its corresponding access value is true and a tag field of said address matches a tag associated with said particular one of said cache lines.

18. The method of claim 16, wherein said producing step comprises the step of applying operators to parameters and said address to produce said access values, each parameter associated with a corresponding cache line.

19. The method of claim 18, wherein said operators comprise arithmetic, logic and comparison operators.

20. The method of claim 18, said applying step comprising the step of applying said operators to said parameters to produce access values corresponding to said cache lines according to the following expression:

((address A value) L mask) C 0, wherein address=said address in binary form, value=a first binary number parameter, mask=a second binary number parameter, A=an arithmetic operator, L=a logical operator, C=a comparison operator, and 0=zero.

21. The method of claim 18, said applying step comprising the step of applying said operators to said parameters to produce access values corresponding to said cache lines according to the following expression:

min $\leq$ address $\leq$ max, wherein address=said address, min=a minimum address value parameter, and max=a maximum address value parameter.

22. The method of claim 18, further comprising the step of a user programming said operator and parameter registers with said operators and said parameters, respectively.

23. The method of claim 22, said programming step comprising the step of programming said operator and parameter registers using main memory write operations, wherein a plurality of main memory addresses are reserved for said operator and parameter registers.

24. The method of claim 22, said programming step comprising the step of a programming said operator and parameter registers using input/output write operations, wherein a plurality of input/output port addresses are reserved for said operator and parameter registers.

25. The method of claim 22, said programming step comprising the step of a programming said operator and parameter registers using programmable memory, wherein said operator and parameter registers are disposed in said programmable memory.

26. The method of claim 22, said programming step comprising the step of programming said operator and parameter registers using dedicated write operations.

27. The method of claim 18, further comprising the steps of:

storing a predetermined plurality of operators in a first plurality of said operator registers associated with a dedicated cache area of cache lines;

storing a plurality of operators in a second plurality of said operator registers associated with all other cache lines in said dedicated cache area;

storing a predetermined plurality of parameters in a first plurality of said parameter registers associated with said dedicated cache area; and storing a plurality of parameters in a second plurality of said parameter registers associated with said all other cache lines in said dedicated cache area.

28. The method of claim 27, further comprising the step of configuring a storage capacity of said dedicated cache area to be equal to a storage capacity of an area of said main memory storing information cacheable in said dedicated cache area.

29. The method of claim 27 further comprising the step of configuring a storage capacity of said dedicated cache area to be less than a storage capacity of an area of said main memory storing information cacheable in said dedicated cache area.

* * * * *